J. P. PAYETTE.
TIRE CHAIN.
APPLICATION FILED JAN. 18, 1919.

1,320,411.

Patented Nov. 4, 1919.
2 SHEETS—SHEET 1.

Inventor
Joseph P. Payette

J. P. PAYETTE.
TIRE CHAIN.
APPLICATION FILED JAN. 18, 1919.

1,320,411.

Patented Nov. 4, 1919.
2 SHEETS—SHEET 2.

Inventor
Joseph P. Payette
By
Attorney.

UNITED STATES PATENT OFFICE.

JOSEPH P. PAYETTE, OF CENTRALIA, WASHINGTON.

TIRE-CHAIN.

1,320,411.  Specification of Letters Patent.  Patented Nov. 4, 1919.

Application filed January 18, 1919. Serial No. 271,839.

*To all whom it may concern:*

Be it known that I, JOSEPH P. PAYETTE, a citizen of the United States, residing at Centralia, in the county of Lewis and State of Washington, have invented certain new and useful Improvements in Tire-Chains, of which the following is a specification.

This invention relates to improvements in tire chains for use upon power driven vehicles, and has for its principal object to provide a device of this character which is of simple and inexpensive construction, readily attachable and detachable, durable, and not likely to get out of order, and in which replacements are easily, quickly and cheaply made. I accomplish these and other objects by the peculiar arrangement and combination of the parts, as will be more fully hereinafter described and explained, shown in the accompanying drawings, and finally pointed out in the appended claim.

Figure 2:
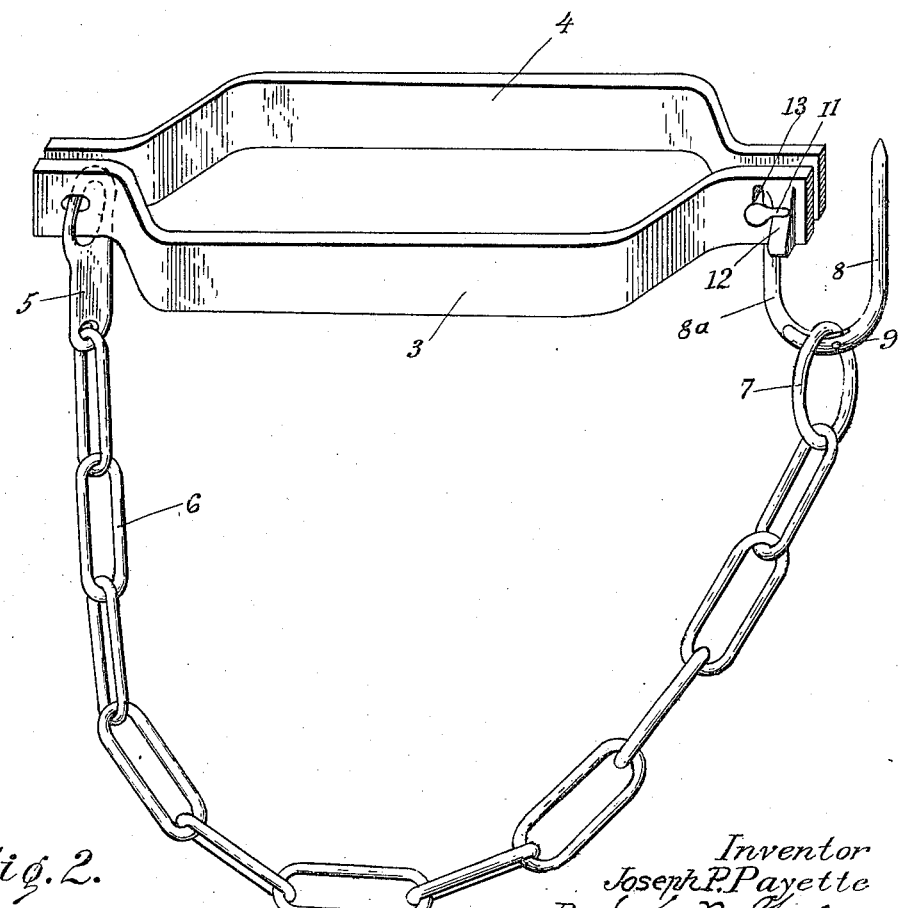
Fig. 2 is a perspective view on an enlarged scale of the tire chain detached.
Figure 3:
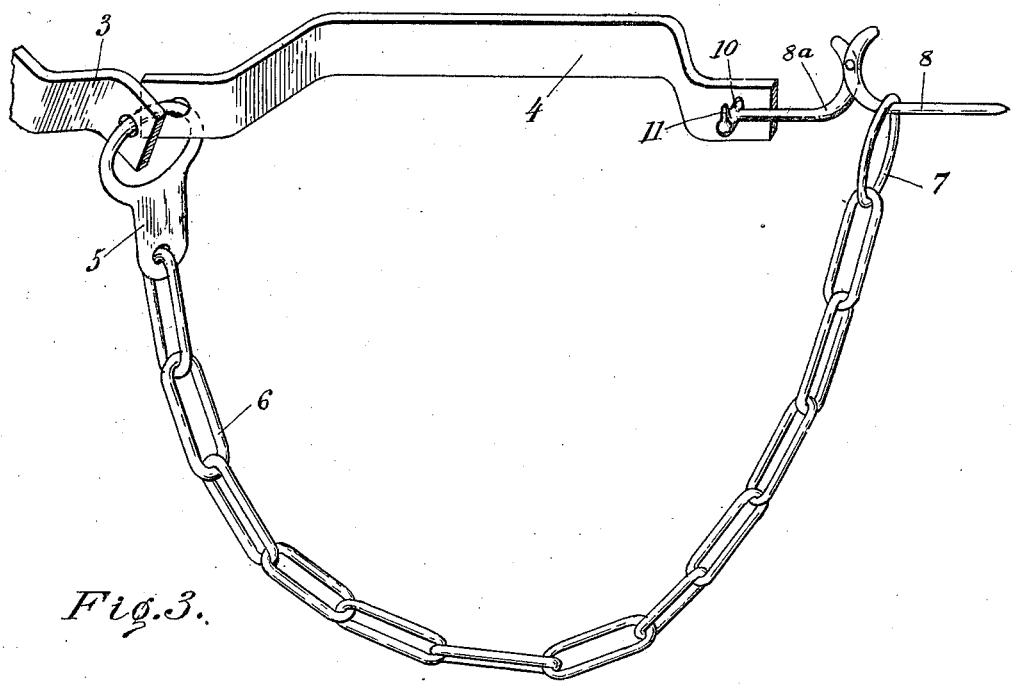
Fig. 3 is a perspective view of parts of the chain.
Figure 4:
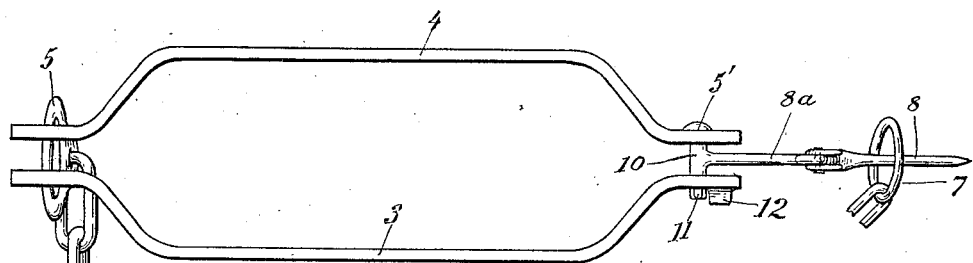
Fig. 4 is a top plan view of the spoke embracing members and fragments of the chain.
Figure 5:
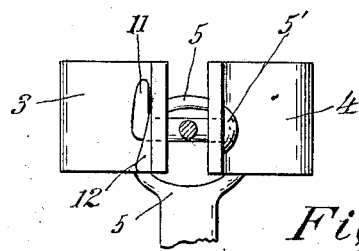
Fig. 5 is an end view of a fragment of the device.

Referring now more particularly to the drawings, numeral 1 indicates a tire which in this instance is a pneumatic tire. 2 indicates the spokes of the wheel. 3 indicates a member bent into the shape as shown, and 4 indicates another member identical with the member 3, except with respect to one of its extreme ends, which will be explained more fully. The members 3 and 4 are joined together at one of their ends by means of an eye member 5, the ends referred to being loosely strung upon this eye member, as plainly seen in Figs. 2, 3 and 4, so as to form a kind of loose hinge joint between the members 3 and 4. To one end of the eye member 5 is attached one end of a chain 6 whose opposite end is attached to a ring 7, which is adapted to be slipped over a hook 8, pivoted to a second hook 8^A by means of a pin 9. The hook 8^A has a shank 10 at right angles to the body of the hook and one end of the shank passes revolubly through an aperture through the member 4, and is upset into a head 5'. The opposite end of the shank has an extension 11 adapted to coöperate with a cam face 12 on one end of the member 3 and adjacent an aperture 13 which passes through the member 3. (See Fig. 2). This aperture is of the same general outline as the end of the shank 10, and the shank has upon it an extension 11, (see Figs. 2 and 5), so that by turning the shank 10 into its position as seen in Fig. 4, the end of the shank and its extension 11 will pass through the aperture 13 and permit the members 3 and 4 to be swung open about their loose hinge 5 as seen in Fig. 3. However, when the shank 10 be turned with respect to the member 4, the extension 11 is taken out of register with the corresponding portion of the aperture 13, and the members 3 and 4 are thus locked together, as seen in Fig. 4. Of course this turning of the shank 10 will cause the extension 11 to ride up upon the cam face 12 and thus force the ends of the two members 3 and 4 more firmly together.

Figure 1:
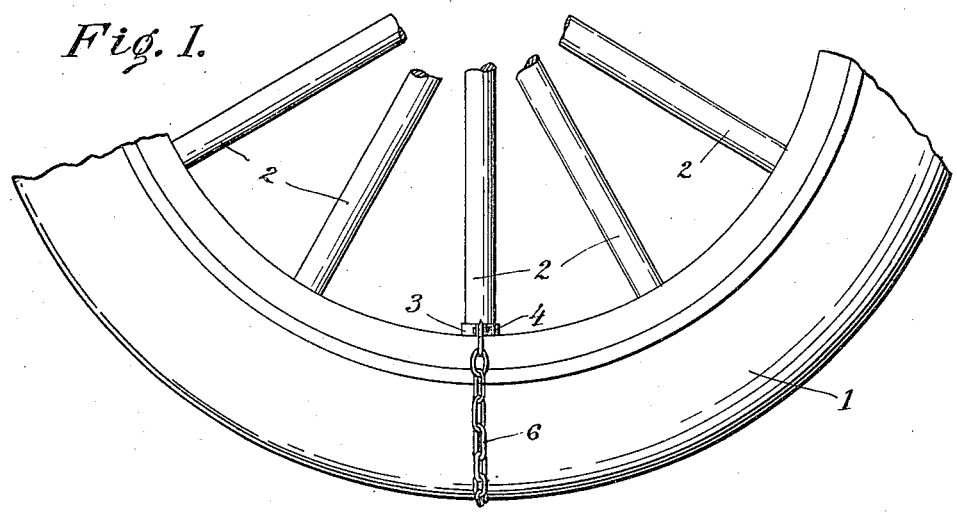
Figure 1 is a side elevation of a fragment of a wheel with one of my tire chains applied.

The operation of the device is that the members 3 and 4 are first placed in open position as seen in Fig. 3 and the spoke 2 of the wheel placed between the members 3 and 4, the end of the chain to which the ring 7 is normally attached meanwhile hanging freely. The ends of the members 3 and 4 to which the hooks 8 and 8^A are attached are now brought together so that the spoke is embraced between the members. (See Fig. 1). The parts are now in position, as also shown in large detail in Fig. 2, the ring 7 having been slipped over the hook 8. The ring 7 is now forced to the left as seen in Fig. 4, until it also passes over the hook 8^A, and the shank 10 is then turned upon its axis. The hook 8 is now turned upon its pin 9 until the parts assume the position shown in Fig. 2. During this turning of the shank 10 the extension 11 of course co-acted with the cam face 12, and thus forced the two ends of the members 3 and 4 more closely together.

From the above it will be seen that when a plurality of my devices are applied to a tire as above described, the tire is caused to grip the road surface and thus promote traction of the wheels and prevent skidding. It will further be seen that when one of the chains 6 becomes worn through it can very readily and quickly be replaced. It will also be seen that since the ring 7 engages the overlapping ends of the hook members, the parts are prevented from becoming disengaged and that the stronger the pull be upon the chain the more closely will the two clamps 3 and 4 be brought together, due to the action of the cam face 12. It will also be seen that the chain 6 has some slight movement with respect to the tire or in other words will creep back and forth a little as the wheel rotates and thus prevent constant wear of the chain upon the same point of the tire.

Having described my invention, what I claim as new and desire to protect by Letters Patent, is—

The tire chain herein described, consisting of the spoke embracing member having chain receiving openings in one end, and having an opening and bayonet slot in the other end, a cam disposed adjacent said slot, a shank pivoted in said opening and slot and formed with an extension to engage said cam, a pivoted hook member movable with said shank, and a chain having one end permanently connected to the openings in the end of said spoke embracing members and its other end adapted to engage said hook for securing the chain in position.

In testimony whereof I affix my signature.

JOSEPH P. PAYETTE.

Copies of this patent may be obtained for five cents each, by addressing the "Commissioner of Patents, Washington, D. C."